United States Patent Office 3,629,246
Patented Dec. 21, 1971

3,629,246
NOVEL DIARYLENE AZOLYL-STYRENE COMPOUNDS AND THE PREPARATION AND USE THEREOF
Toshiki Tanaka, Wakayama, Japan, assignor to Nippon Chemical Works Co., Ltd., Wakayama, Japan
No Drawing. Continuation of application Ser. No. 265,365, Mar. 15, 1963. This application Dec. 4, 1968, Ser. No. 800,785
Claims priority, application Japan, July 4, 1962, 37/28,133; July 10, 1962, 37/28,326; July 24, 1962, 37/31,222; Sept. 4, 1962, 37/37,932, 37/37,933, 37/37,934; Nov. 5, 1962, 37/49,544; Nov. 29, 1962, 37/53,406; Dec. 19, 1962, 37/57,634, 37/57,635; Jan. 5, 1963, 38/649; Feb. 11, 1963, 38/6,829
The portion of the term of the patent subsequent to Feb. 23, 1988, has been disclaimed
Int. Cl. C09b 23/14
U.S. Cl. 260—240 D      6 Claims

ABSTRACT OF THE DISCLOSURE

Optical brightening agents consist of a diarylene azolyl-styrene compound which is free from water-solubilizing groups and groups capable of imparting dye character thereto and which corresponds to the general formula:

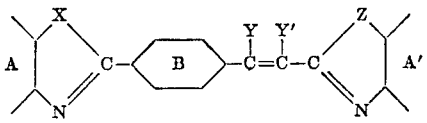

wherein A and A' individually represents a benzene or naphthalene radical fused with the adjacent azole ring, B represents a benzene nucleus, X and Z individually represents a member selected from the group consisting of oxygen, sulfur and a radical N—R (in which R is hydrogen or methyl), and at least one of said X and Z being selected from oxygen and sulfur and Y and Y' individually represents one member selected from the group consisting of hydrogen, halogen and lower alkyl.

---

This application is a continuation of Ser. No. 265,365 filed Mar. 15, 1963, now abandoned.

This invention relates to novel diarylene azolyl-styrene compounds and the processes for the preparation thereof. In another aspect, this invention further relates to the use of these compounds as optical brightening agents.

New compounds of the diarylene azolyl-styrene series, to which reference is made in the present invention, may be represented by the following general formula:

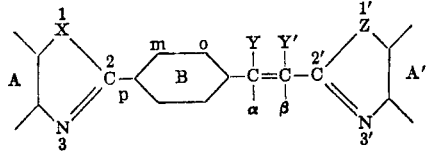

wherein A and A', same or different, individually stands for a benzene or naphthalene nucleus which is fused to the adjacent azole ring and which may have any other suitable substituent; B stands for a benzene nucleus which may have any other suitable substituent; X and Z, same or different, individually stands for O, S or NR (in which R means hydrogen, or alkyl, aryl or aralkyl radical), and in case either one of X and Z is NR, the other should be O or S; and Y and Y', same or different, individually stands for hydrogen, halogen or alkyl radical.

A structural characteristic of novel compounds of the present invention is that these compounds have two arylene azole rings of the same or different types, which are connected through a styryl group, one of the said azole rings being attached at its 2-position to the para-position of the styrene and the other attached at its 2'-position to the β-position of the same styrene.

With respect to substituents on aromatic radicals which form a skeleton of the compounds, it is to be noted that these compounds should be free from salt-forming or water-solubilizing groups, such as sulphonic or carboxylic acid group. Furthermore, the compounds of the present invention should not contain any group capable of imparting dye character to the compounds. However, other substituents than those specified above may be present in the aromatic portion of the compounds, insomuch as these substituents do not cause undesired modification in physical and chemical natures of the compounds. Typical substituents include alkyl, aryl, aralkyl, cycloalkyl, alkoxy, aralkoxy, cyano and nitro groups and halogen. If desired, substituted hydrocarbon radicals, e.g. those containing cyano, hydroxy, sulphonyl or carbonyl group or ethereal or amino linkage may be present in the aromatic structure of the compounds of the present invention. As another characteristic of the compounds of the present invention, the presence of a benzene ring constituting the styryl portion of the molecule should be noted, and it can be appreciated that high substantiveness as well as light fastness and thermal resistance are imparted to the compounds of the present invention as a result of the presence of the aforementioned benzene ring. In other words, inclusion of aryl arylene azole in the molecule of the novel compounds is of the extreme importance to show good substantiveness when the said compound is applied to the variety of materials. For instance, arylene azolyl ethylenes, in which the aforementioned benzene ring is deficient, show only very poor optical brightening activity for hydrophobic textile materials, e.g. polyolefin fibers, with appreciably decreased light fastness. In comparison with the corresponding styrenes, the sulfonic acid derivatives of the known ethylenes show less affinity to cellulosic fibers and also show less stability against light attack.

The novel compounds of the present invention when dissolved in solvents exhibit fluorescence of particular color tones under sunlight or ultra-violet ray and can provide desirable optical brightening action when they are applied to the variety of materials. In case two arylene azole rings attached to both sides of a styryl portion are of the different types, the color tone of fluorescence resulted from the relevent compound is not simple, but of a specific nuance, and it enables us to obtain highly improved appearance of an article.

In application of the novel compounds of the present invention as optical brightening agents, at least one of two azole rings within their molecules should desirably be oxazole or thiazole ring. In case both of two azole rings are imidazole ring, the relevent compounds are less affinitive and less light-resistant, and they are also disadvantageous because their fluorescence will be adversely affected by acids or alkalis.

Diarylene azole-styrene compounds of the present invention can be prepared by a suitable way including the following method which may be most advantageous because of availability of a starting material, reaction conditions, reactor apparatus and high purity and yield of the product obtained.

According to a process of the present invention, the diazonium compound of 2-(p-aminoaryl)-arylene azole having the general Formula 1

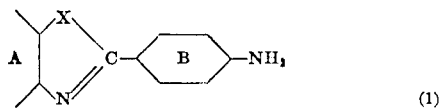

(wherein A, X and B have the same significance as mentioned before) is brought into reaction with α,β-unsaturated dicarboxylic acid of the general Formula 2

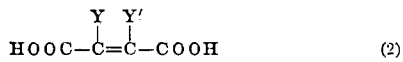

(wherein Y and Y' have the same significance as defined before) or the anhydride thereof in the presence of a suitable catalyser, thereby forming [arylene azolyl-(2)]-cinnamic acid of the general Formula 3

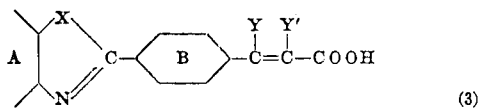

(wherein A, X, B, Y and Y' have the same significance as mentioned above). This compound (3) is further reacted with the diazonium compound of 2-amino-arylene thiazole having the general Formula 4

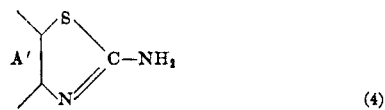

in the presence of a suitable catalyser, thereby obtaining a styryl compound of the general formula

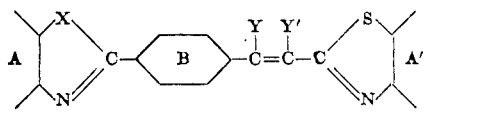

(wherein A, X, B, Y, Y' and A' have the same significance as mentioned above).

Alternatively, [arylene azolyl-(2)]-cinnamic acid of the general formula (3) may be condensed with an aromatic amino compound of the general Formula 5

(wherein A' has the same significance as given above, and ZH and NH₂ are attached to one carbon atom and the adjacent (ortho-positioned) carbon atom respectively of A' nucleus) to produce the corresponding styryl compound.

In a still alternative method, β-[arylene azolyl-(2)]-acrylic acid of the general formula

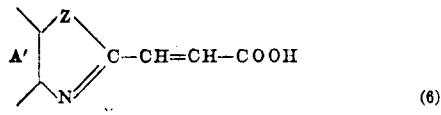

(wherein A' and Z have the same significance as above) is reacted with the diazonium compound of 2-(p-aminoaryl)-acrylene azole of the general Formula 1 in the presence of a suitable catalyser, thereby forming the corresponding styryl compound.

The preparatory methods disclosed in the present invention can be classified into the following two groups depending on the types of reactions;

(a) Meerwein type condensation reaction between a particular diazonium compound and a particular α,β-unsaturated di- or mono-carboxylic acid or its anhydride, and (b) Fusion condensation reaction between a particular α,β-unsaturated mono-carboxylic acid and a particular aromatic amino compound.

These reactions (a) and (b) can be carried out separately or simultaneously.

In order for carrying out the reaction (a) in effect, the suitable catalyser used is copper chloride, especially cuprous chloride. The joint use of cupric chloride and acetone is preferrable for the reaction (a), since the former reacts slowly with the latter to form cuprous chloride as a powerful catalyst. Sodium acetate or the like alkali salt of weak acid, may be used singly or in combination. Preferred reaction temperatures are relatively low, e.g. below about 50° C. Reaction usually is effected in aqueous solution. In response to the progress of the reaction, the product will crystallize out. After a relatively short period (e.g. 2–3 hours) within which the reaction is complete, working up of the product may be carried out, which includes filtration and recrystallization. The reaction (a) is very acceptable for the commercial scale production, because of the availability at low cost of a wide variety of starting materials and the ease and simplicity of performing the reaction.

Reaction (b) referred to above can be easily accomplished at a temperature ranging from 100° to 250° C. In this case, the reaction may be carried out in the presence or absence of an inert gas, such as carbon dioxide or nitrogen, or under air-free conditions. If required, the reaction can preferably be carried out in the medium of saturated hydrocarbon or the like inert organic solvent, or in the presence of a suitable quality of a dehydrating catalyst, e.g. zinc chloride, anhydrous alumina, or boric or phosphoric acid. If desired, temperature raise for the reaction may be made stepwise, and condensation reaction may be reinitiated after the intermediate condensation product is worked up once to remove water from the reaction system, the said water having been formed during the pre-condensation reaction. End point of the reaction (b) as well as that of (a) can be ascertained by measuring the amount of gas or water formed.

Useful compounds for the preparatory methods of the present invention are defined above with reference to several general formulas. Particularly preferred as 2-(p-amino aryl)-arylene azoles of the general Formula 1 are the following:

2-(p-amino phenyl)-benzoxazole
2-(p-amino phenyl)-5-methyl-benzoxazole
2-(p-amino phenyl)-5.7-dimethyl-benzoxazole
2-(p-amino-m-chloro-phenyl)-5-methylbenzoxazole
2-(p-amino phenyl)-5-chloro-benzoxazole
2-(p-amino phenyl)-5-methoxy-benzoxazole
2-(p-amino phenyl)-benzthiazole
2-(p-amino phenyl)-6-methyl-benzthiazole
2-(p-amino-m-tolyl)-4,6-dimethyl-benzthiazole
2(p-amino-phenyl)-6-nitro-benzthiazole
2-(p-amino phenyl)-6-methoxy-benzthiazole
2-(p-amino phenyl)-1-methyl-benzimidazole
2-(p-amino phenyl)-naphtho (1:2) thiazole
2-(p-amino phenyl)-naphtho (2:1) thiazole Particularly preferred as α,β-unsaturated dicarboxylic acids of the general Formula 2 are fumaric acid, maleic acid, mono- or di-chloro maleic acid, mono- or di-methyl maleic acid, mono- or di-ethyl maleic acid, etc. As well known in the art, the anhydrides of these dicarboxylic acids also are preferable, which include maleic anhydride, mono- or di-chloro maleic anhydrides, mono- or di-methyl maleic anhydrides, and the like.

Typical 2-amino-arylene thiazoles of the general Formula 4 include the following:

2-amino-benzthiazole
2-amino-4-methyl-benzthiazole
2-amino-6-methylbenzthiazole
2-amino-4,6-dimethyl-benzthiazole
2-amino-6-chloro-benzthiazole 2-amino-6-nitro-benzthiazole
2-amino-6-methoxy-benzthiazole
2-amino-6-ethoxy-benzthiazole
2-amino-naphtho (1:2) thiazole
2-amino-naphtho (2:1) thiazole Typical aromatic amino compounds of the general Formula 5 include the following:

1-amino-2-hydroxy-benzene
1-amino-2-hydroxy-5-methyl-benzene
1-amino-2-hydroxy-5-methoxy-benzene
1-amino-2-hydroxy-3,5-dimethyl-benzene
1-amino-2-hydroxy-4-nitro-benzene
1-amino-2-hydroxy-4-chloro-benzene
1-amino-2-hydroxy-naphthalene
2-amino-thiophenol
2-amino-5-methyl-thiophenol
1-amino-2-monomethyl-amino-benzene Typical β-[arylene azolyl-(2)]-acrylic acids of the general formula (6) include the following:

β-[benzoxazolyl-(2)-acrylic acid
β-[5-methyl-benzoxazolyl-(2)]-acrylic acid
β-[5,7-dimethyl-benzoxazolyl-(2)]-acrylic acid
β-[5-methoxy-benzoxazolyl-(2)]-acrylic acid
β-[-chloro-benzoxazolyl-(2)]-acrylic acid
β-[5-nitro-benzoxazolyl-(2)]-acrylic acid
β-[naphtho-(2,1)-oxazolyl-(2)]-acrylic acid
β-[benzothiazolyl-(2)]-acrylic acid
β-[6-methyl-benzothiazolyl-(2)]-acrylic acid
β-[4,6-dimethyl-benzothiazolyl-(2)]-acrylic acid
β-[6-chloro-benzothiazolyl-(2)]-acrylic acid
β-[6-methoxy-benzothiazolyl-(2)]-acrylic acid
β-[6-nitro-benzothiazolyl-(2)]-acrylic acid
β-[naphtho-(2,1)-thiazolyl-(2)]-acrylic acid
β-[benzoimidazolyl-(2)]-acrylic acid
β-[1-methyl-benzoimidazolyl-(2)]-acrylic acid In a specific embodiment of the present invention where a styrene compound having two oxazole or thiazole rings of the same type, bridged with a styryl group, is intended as styryl compound, 4-carboxy-cinnamic acid represented by the general Formula 7

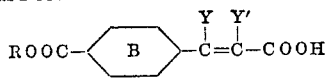

$$ROOC-\langle B \rangle -\overset{Y}{\underset{|}{C}}=\overset{Y'}{\underset{|}{C}}-COOH \quad (7)$$

(wherein B, Y and Y' are the same meaning as above and R is hydrogen or lower alkyl radical) is mixed with an aromatic amino compound (excepting O-diamines) of the general Formula 5 and then the resulting mixture is subjected to the fusion condensation reaction referred hereinbefore as the reaction (b).

Particularly preferable as the compounds of the general Formula 7 are the following:

4-carboxy-cinnamic acid
2-methyl-4-carboxy-cinnamic acid
3-methyl-4-carboxy-cinnamic acid
2,5-dimethyl-4-carboxy-cinnamic acid
2-chloro-4-carboxy-cinnamic acid
3-chloro-4-carboxy-cinnamic acid
2-methoxy-4-carboxy-cinnamic acid
2-cyano-4-carboxy-cinnamic acid Those compounds the name of which are specified above are informative only, and they are not to be construed as limiting the scope of the invention thereto. Starting materials for the preparatory methods of the present invention should be optionally selected depending on availability of such materials and the type of desired products.

Diarylene azolyl-styrene compounds thus produced in the present invention are pale yellow or creamy white crystalline powder, which can yield clear solutions in an organic solvent. They are hardly soluble in water and slightly soluble in methanol, ethanol, chlorobenzene and dimethyl formamide, and have no dye character, i.e. they do not dye materials when they are applied at a customary concentration. Generally speaking, these compounds are highly stable against heat, light and other physical and chemical attack. These compounds, when dispersed in water, alcohol or other solvents, are substantive to high molecular polymeric synthetic shaped articles. The articles which have been treated with such compounds exhibit good light fastness, laundry fastness and perspiration fastness, with improved white appearance. Such intense and durable optical brightening effect as mentioned above is not only comparable to that of any conventionally known agents but, in many cases, distinguished over them.

Accordingly the compounds of the present invention are used as optical brightening agents for high molecular polymeric shaped articles. Such shaped articles may be in the form of filaments, yarns, threads, films, sheets, ribbons, foils or plates, or in any other shaped forms, and they are made of synthetic organic high polymeric materials, including polyesters and polyolefins. The term "polyesters" used here particularly mean fiber-forming linear polymeric esters derived from dicarboxylic acid and di-hydric alcohol, e.g. polyethylene glycol terephthalate, and that "polyolefin" particularly means the homopolymers and copolymers of olefins, e.g. polypropylene or ethylene-propylene copolymers.

The use of the compounds of the present invention as optical brightening agents for those high molecular polymeric shaped articles also is one of the features of the invention. In order for application of the compounds of the general Formula I, such compounds can be permeated into or spread on high molecular polymeric shaped articles. Alternatively, these compounds can be incorporated or combined into high polymeric materials before they have been shaped in desired form. For example, one or more of these compounds may be incorporated to a mass comprising a filament- or film-forming high polymeric material, the said compounds being in an amount of 0.001-0.1% based on the weight of the high polymeric material and then the mass is formed into a desired shape by spinning or extrusion. As one of the particular advantages of the invention, it is to be noted that the styryl compounds of the present invention, because of their good thermal stability, can be used in the hot melt of a polymer having a melting point as high as about 250° C. Accordingly, the compounds of the invention can be applied to a variety of materials, especially polyester or polyolefinic materials, before, during or after forming of such materials, thereby to produce desired shaped article having highly improved appearance.

In dyeing (or optical brightening) of polyester or polyolefin textile materials, e.g. "Terylene," "Dacron," "Pyren," etc., the compounds of the present invention can be advantageously used in aqueous dispersions or solvent solutions under acidic, neutral or alkaline conditions. For instance, those compounds, singly or in combination, are uniformly dispersed in water or a suitable solvent, with or without a suitable dispersing or permeating agent, e.g. surface active agents. With the resulting dispersion or solution, polyester fiber is treated in the usual manner as by ordinary dyeing, carrier dyeing, high temperature dyeing, or thermosol dyeing. The textile material so treated absorbs ultraviolet light from sunlight or fluorescent light emits the adsorbed energy as blue light. Thus, polyester or polyolefinic textile materials which are not colored are imparted with permanently durable white appearance through compensation for yellow tints, and those which have been colored are imparted with improved purity of original color and with brightness.

Polyester- or polyolefin- made materials (e.g. polyethylene or polypropylene fiber, film, etc.) are known difficult to be dyed, stained or similarly processed. The compounds of the presentation show unexpectedly high affinity even to these materials. For example, use of the styrene compounds in a small quantity of about 0.01% can provide intense and durable whitening effect with good fastness against light or similar attack. Furthermore, there is no worry about contamination or staining of the material even when an excess of the styrene compounds is applied to the said material. It is of course possible to apply the styrene compounds of the invention to the afore-mentioned polymeric materials which have been modified by a suitable way, e.g. chemical treatment following to dry-, wet- or melt-spinning, and if desired, a wide variety of conventionally known adjuvants including soap, surface active agents, dye assistants and oxidizing agents or organic or inorganic salts can be used without any adverse effect on the styrene compounds of the present invention.

It has also been found that the sulfonamides and sulfonic acid derivatives of the above-referred styrene compounds are valuable as fairly water-soluble fluorescent whitening agents for cellulosic materials. The chloromethyl derivatives and quaternary compounds of the styrenes of the present invention also are found to be useful cationic fluorescent whitening agents which are fairly soluble in water, and the carbonyl or sulfonyl derivatives of the styrene compounds are valuable as fluorescent whitening agents for hydrophobic materials. Accordingly, the styrene compounds of the present invention can be useful intermediates for the preparation of a variety of new fluorescent whitening agents.

The methods of preparing diarylene azolyl-styrenes of the present invention and uses thereof will be explained in detail with reference to the following examples in which, unless otherwise specified, all parts and percentages are expressed by weight.

EXAMPLE 1

10 parts of fumaric acid is dissolved in 100 parts of water, and then 40 parts of crystalline sodium acetate is added thereto. To the resulting solution, with stirring at 0°–5° C., 250 parts of the solution containing the diazonium salt of 24 parts of 2-(p-aminophenyl)-6-methyl-benzthiazole is added rapidly. Then, 20 parts of 10% hydrochloric acid containing 0.5 part of cuprous chloride is added below 10° C., and after 30 minutes, the temperature is gradually raised. The reaction is effected for an hour at about 50° C. At the end of the reaction, bubbling ceases and the diazonium compound completely disappears. The reaction product is filtered, washed with water, and then extracted with 500 parts of 3% sodium carbonate solution. To the liquid extract obtained, dilute hydrochloric acid is added to yield pale yellow p-[6-methyl benzthiazolyl-(2)]-cinnamic acid. It is dried, and 30 parts thereof is mixed with 12 parts of 1-amino-2-hydroxy-5-methyl-benzene. Condensation reaction is effected in a vessel, to which nitrogen gas is passed, at 160°–170° C. for six hours and then at 200°–210° C. for two hours. After cooling, the reaction product is pulverized and washed thoroughly with hot water containing caustic soda, and recrystallized from dimethyl formamide to give pale yellow crystalline product of M.P. 241°–243° C. (uncorrected) having the formula:

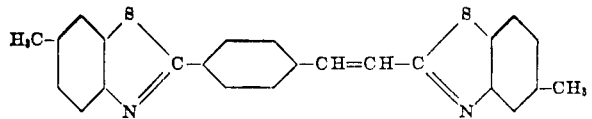

The results of elementary analysis are as follows.

Calcd. for $C_{24}H_{18}ON_2S$ (percent): C, 75.39; H, 4.73; N, 7.33; S, 8.38. Found (percent): C, 75.20; H, 4.70; N, 7.30; S, 8.46.

This compound (p-[6-methyl-benzthiazolyl-(2)]-β-[5'-methyl-benzoxazolyl-(2')]-styrene) is hardly soluble in water and alcohol, slightly soluble in chlorobenzene, a little soluble in dimethyl formamide, and shows strongly bluish violet fluorescence under ultraviolet ray.

By the similar way, the following compounds can be prepared.

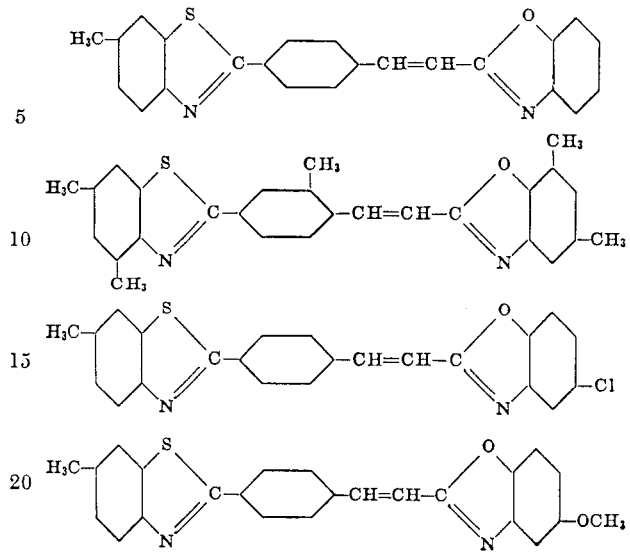

EXAMPLE 2

30 parts of p-[6-methyl-benzthiazolyl-(2)]-cinnamic acid, prepared as in Example 1, is dissolved in a mixed solution of 4 parts caustic soda, 50 parts water and 200 parts acetone, and after making the solution weakly acidic by adding acetic acid, 250 parts of a solution containing the diazonium compound obtained from 16 parts of 2-amino-6-methyl-benzthiazole is added thereto with stirring at about 0° C. while maintaining the resulted mixture at the same temperature, 20 parts of 10% hydrochloric acid containing 0.5 part of cuprous chloride and further 150 parts of a saturated sodium acetate solution are rapidly added thereto. After 30 minutes, the temperature is gradually raised up to about 50° C., at which the reaction is carried out for additional two hours. When evolution of gas ceases and the diazonium compound completely disappears, the reaction product is filtered and then washed thoroughly with dilute hydrochloric acid, dilute alkali and water in sequence, and recrystallized from dimethyl formamide to give pale yellow crystals of M.P. 263°–265° C. (uncorrected) having the formula:

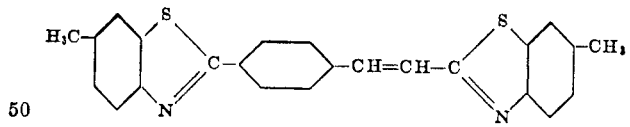

The elementary analytical data are as follows.

Calcd. for $C_{24}H_{18}S_2N_2$ (percent): C, 72.36; H, 4.52; N, 7.04; S, 16.08. Found (percent): C, 72.20; H, 4.60; N, 7.02; S, 16.12.

This compound (p,β-di-[6-methyl-benzthiazolyl-(2),(2')]-styrene) is hardly soluble in water and alcohol, slightly soluble in chlorobenzene and a little soluble in dimethyl formamide and shows blue fluorescence under ultraviolet ray.

EXAMPLE 3

21 parts of β-[5-methyl-benzoxazolyl-(2)]-acrylic acid is dissolved in 100 parts of water containing 4 parts of sodium hydroxide. To the resulting solution, acetic acid is added to make it weakly acidic. With stirring, 50 parts of a saturated sodium acetate solution is added and then 250 parts of a solution containing the diazonium compound obtained from 24 parts of 2-(p-aminophenyl)-6-methyl-benzthiazole is added at the temperature near 0° C. 20 parts of 10% hydrochloric acid containing 0.5 part of cuprous chloride is rapidly added at the same temperature. Reaction is carried out for 50 minutes, and then the temperature is gradually raised and the reaction is effected for additional two hours at 50° C. When bubbling ceases and the diazonium compound completely disappears, the reaction product is filtered, and washed thoroughly with hot dilute hydrochloric acid and hot water, and then recrystallized from dimethyl formamide to yield p-[6-methyl-benzthiazolyl-(2)]-β-[5'-methyl - benzoxazolyl - (2')]-styrene which does not show depression in melting point when mixed with the authentic sample obtained by Example 1.

EXAMPLE 4

20 parts of β-[6-methyl-benzthiazolyl-2)]-acrylic acid is dissolved in a mixed solution of 4 parts sodium hydroxide, 50 parts water and 200 parts acetone. Then, acetic acid is added to make the resultant solution weakly acidic, and 20 parts of sodium acetate is added. Then, 250 parts of a solution containing the diazonium compound obtained from 24 parts of 2-(p-aminophenyl)-6-methyl-benzthiazole is added with stirring below 10° C. At the same temperature, 20 parts of 10% hydrochloric acid containing 0.5 part of cuprous chloride is added thereto, and the reaction is effected for 30 minutes. Then, the temperature is gradually raised up to 50° C., at which the reaction is effected for additional two hours. When bubbling ceases and the diazonium compound completely disappears, the reaction product is filtered and washed thoroughly with hot dilute hydrochloric acid and hot water, and then recrystallized from dimethyl formamide to yield p,β - di - [6-methyl-benzthiazolyl - (2),(2')]-styrene which shows no melting point depression when mixed with the authentic sample prepared by the procedures of Example 2.

EXAMPLE 5

10 parts of maleic acid anhydride is dissolved in a mixed solution of 200 parts acetone and 20 parts water, and 40 parts of crystalline sodium acetate is added thereto. With stirring at a temperature below about 10° C., 250 parts of a solution containing the diazonium compound obtained from 24 parts of 2-(p-aminophenyl)-5-methyl-benzoxazole, and then 20 parts of 10% hydrochloric acid containing 0.5 part of cuprous chloride are added to the above-resulted solution. At the same temperature, reaction is effected for about 30 minutes and then the temperature is gradually raised up to about 50° C., at which the reaction is effected for additional one hour. When bubbling ceases and the diazonium compound completely disappears, the reaction product is filtered, and washed well with water, and then extracted with 500 parts of 3% sodium carbonate solution. To the liquid extract obtained, dilute hydrochloric acid is added to yield pale yellow p-[5-methyl-benzoxazole-(2)]-cinnamic acid. It is dried and 30 parts thereof is mixed with 12 parts of 1-amino-2-hydroxy-5-methylbenzene and 3 parts of boric acid as a dehydrating agent. Condensation is effected by heating for four hours at 150°–170° C. and thereafter for two hours at 200°–210° C. After cooling, the reaction product is pulverized, washed thoroughly with hot water containing caustic soda and recrystallized from dimethyl formamide to obtain light orange crystals of M.P. 253°–255° C. (uncorrected) having the formula

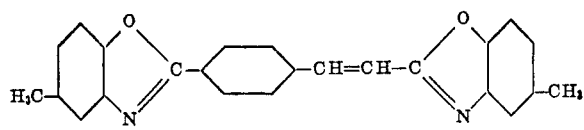

Its elementary analysis shows:

Calcd. for $C_{24}H_{18}O_2N_2$ (percent): C, 78.69; H, 4.92; N, 7.65. Found (percent): C, 78.80; H, 4.78; N, 7.60.

This compound (p,β-di-[5-methyl-benzoxazolyl - (2), (2')]-styrene) is hardly soluble in water, slightly soluble in alcohol and chlorobenzene and a little soluble in dimethyl formamide and shows blue violet fluorescence under ultra violet ray.

By the similar way the following compounds can be prepared,

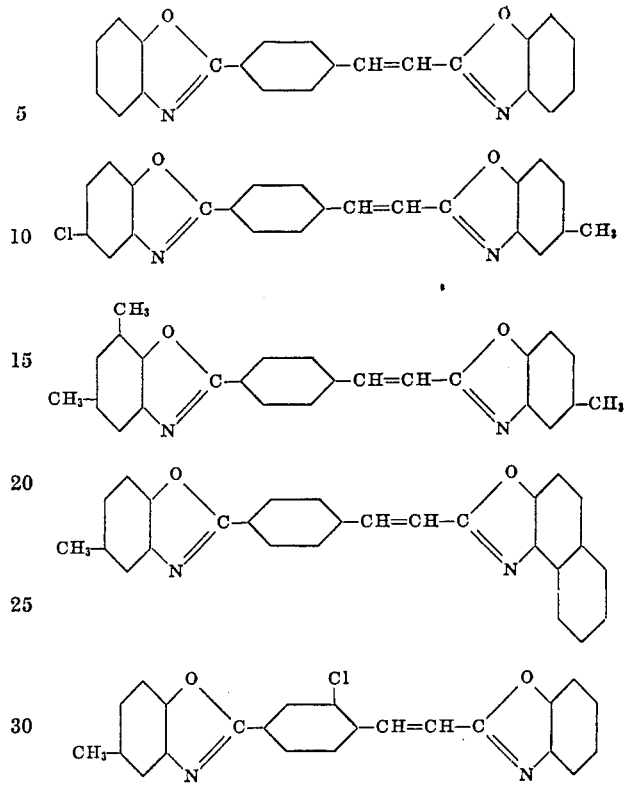

EXAMPLE 6

30 parts of p-[5-methyl-benzoxazolyl-(2)]-cinnamic acid, prepared as in Example 5, is dissolved into a solution of 4 parts caustic soda and 200 parts water, and the resulting solution is made weakly acidic by addition of acetic acid, at the temperature near 0° C. With stirring the solution at about 0° C., 250 parts of a solution containing the diazonium compound of 16 parts of 2-amino-6-methyl-benzthiazole is added, and at the same temperature, 20 parts of 10% hydrochloric acid containing 0.5 part of cuprous chloride also is added. Then 20 parts of 10% sodium carbonate solution is rapidly added. After reaction is effected for 30 minutes, the temperature is gradually raised up to 50° C., at which the reaction is further continued for two hours. When bubbling ceases and the diazonium compound completely disappears, the reaction product is filtered, washed thoroughly with dilute hydrochloric acid, dilute alkali solution and water in sequence, and then recrystallized from dimethyl formamide to yield light yellow crystals of M.P. 257°–260° C. (uncorrected) having the formula

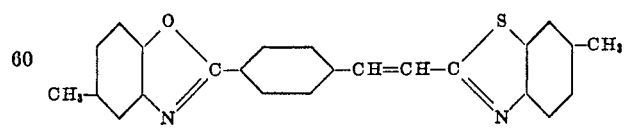

The elementary analysis of this material shows:

Calcd. for $C_{24}H_{18}OSN_2$ (percent): C, 75.39; H, 4.73; N, 7.33; S, 8.38. Found (percent): C, 75.45; H, 4.67; N, 7.30; S, 8.37.

This compound (p-[5-methyl-benzoxazolyl-(2)]-β-[6'-methyl-benzthiazolyl-(2')]-styrene) is hardly soluble in water and alcohol, slightly soluble in chlorobenzene and a little soluble in dimethyl formamide and shows blue violet fluorescence under ultra violet ray.

By the similar way, the following compounds can be prepared.

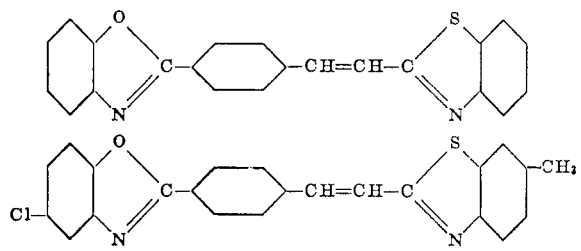

EXAMPLE 7

30 parts of dried p-[5-methyl-benzoxazolyl-(2)]-cinnamic acid, prepared as in Example 5, is mixed with 12 parts of 1.2-diamino benzene. Condensation is effected in vacuo by heating for two hours at 100°–170° C. and then for two hours at 190°–200° C. After cooling, the reaction product is pulverized and extracted with 25% hydrochloric acid, and the extract is diluted with a large amount of water, whereby the product is separated as crystals. The product is washed thoroughly with hot water containing caustic soda and recrystallized from dimethyl formamide to yield light yellow crystals of M.P. 255°–258° C. (uncorrected) having the formula

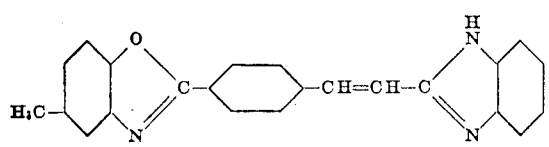

Its elementary analysis shows:
Calcd. for $C_{23}H_{17}ON_3$ (percent): C, 78.63; H, 4.84; N, 11.95. Found (percent): C, 78.68; H, 4.80; N, 11.80.

This compound (p-[5 - methyl-benzoxazolyl-(2)]-β-[benzimidazolyl-(2')]-styrene) is hardly soluble in water, slightly soluble in alcohol and a little soluble in chlorobenzene and dimethyl formamide, and shows blue fluorescence under ultra violet ray.

By the similar way, the compound having the formula can be prepared.

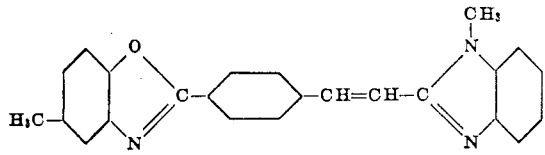

EXAMPLE 8

10 parts of fumaric acid is dissolved in a mixed solution of 200 parts acetone and 20 parts water, and 40 parts of crystalline sodium acetate is added to the resulted solution. With stirring at a temperature below 10° C. 250 parts of a solution containing the diazonium compound obtained from 24 parts of 2-(p-aminophenyl)-benzimidazole is added, and thereafter 20 parts of 10% hydrochloric acid containing 0.5 part of cuprous chloride also is added. At that temperature, reaction is effected for about 30 minutes, and then the temperature is gradually raised up to about 50° C., at which the reaction is further effected for an hour. When bubbling ceases and the diazonium compound disappears, the reaction product is filtered, washed thoroughly with water, and then extracted with 500 parts of 3% sodium carbonate solution. To the liquid extract obtained, dilute hydrochloric acid is added to yield light yellow p-[benzimidazolyl-(2)]-cinnamic acid.

A portion (30 parts) of the dried product is mixed with 12 parts of 1 - amino-2-hydroxy-5-methyl-benzene and 3 parts of boric acid as a dehydrating agent. Condensation is effected by heating for 4 hours at 150°–170° C. and for two hours at 200°–210° C. After cooling, the product is pulverized and washed thoroughly with hot water containing caustic soda, and recrystallized from dimethyl formamide to yield light yellow crystals of M.P. 258°–260° C. (uncorrected) having the formula

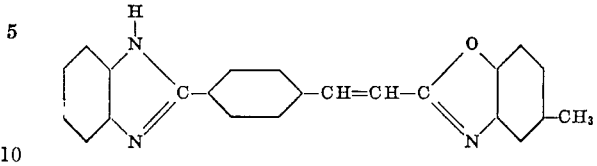

Its elementary analysis shows:
Calcd. for $C_{23}H_{17}ON_3$ (percent): C, 78.63; H, 4.84; N, 11.97. Found (percent): C, 78.70; H, 4.78; N, 11.90.

This compound (p-[benzimidazolyl-(2)]-β[5'-methyl-benzoxazolyl - (2')]-styrene is hardly soluble in water, slightly soluble in alcohol and chlorobenzene and a little soluble in dimethyl formamide, and shows blue violet fluorescence under ultra violet ray.

By the similar way, the compound having the formula can be prepared:

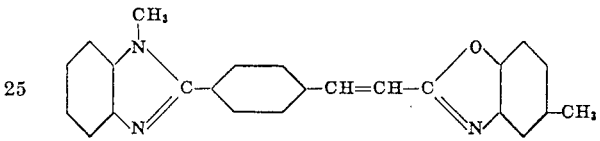

EXAMPLE 9

Eleven parts of 4-carboxy-cinnamic acid, 27 parts of 1 - amino-2-hydroxy-5-methyl-benzene and 3 parts of boric acid are mixed well. The resulted mixture is subjected to condensation reaction by heating for 4 hours at 150°–170° C. and then for 2 hours at 200°–210° C. The reaction product is pulverized, washed well with hot water containing caustic soda, and then recrystallized from dimethyl formamide. p,β-di-[5-methyl-benzoxazolyl-(2),(2')]-styrene obtained does not show depression in melting point when mixed with the authentic sample prepared by the procedures of Example 5.

EXAMPLE 10

Thirteen parts of 3-chloro-4-carboxy-cinnamic acid, 27 parts of 1 - amino-2-hydroxy-5-methyl-benzene and 3 parts of boric acid are mixed, and the resulted mixture is heated for 4 hours at 150°–170° C. and then for additional 2 hours at 200°–210° C. After completion of the fusion condensation reaction, the resulting reaction product is pulverized and then washed well with hot water containing caustic soda. Recrystallization from dimethyl formamide gives pale yellow crystals of M.P. 213°–214° C. (uncorrected) having the chemical formula

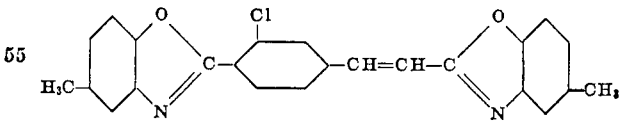

Its elementary analysis shows:
Calcd. for $C_{24}H_{19}N_2O_2Cl$ (percent): C, 71.91; H, 4.24; N, 6.99; Cl, 8.86. Found (percent): C, 71.50; H, 4.30; N, 7.03; Cl, 8.91.

This compound (p,β-di-[5 - methyl-benzoxazolyl-(2),-(2')]-m-chloro-styrene) is hardly soluble in water, slightly soluble in alcohol and chlorobenzene, and a little soluble in dimethyl formamide, and it shows blue violet fluorescence under ultra-violet ray.

By the similar way, the compound having the following formula can be obtained:

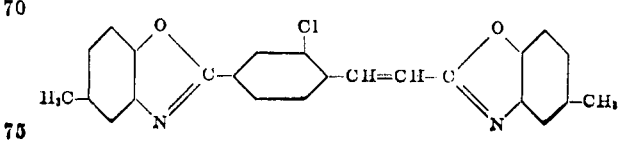

EXAMPLE 11

One part of the compound prepared as in Example 1 is mixed with 5 parts of the condensation product obtained from naphthalene sulphonic acid and formaldehyde. The resulting mixture is masticated thoroughly with a small amount of water, and dispersed into a large amount of warm water to make the whole 1000 parts. Then, the resulted dispersion in an amount sufficient to provide 0.01%, based on the weight of polypropylene fabric, of the aforesaid compound is placed in a treating bath, and the fabric is treated at a bath ratio of 1:30 at 90°–100° C. for 30 minutes. The treated fabric is washed with water and dried to obtain the product having fairly brightened appearance as well as good light and laundry fastness. In this treatment, addition of suitable salts, dye assistants, other surface active agents, acids or alkalis are acceptable, and use of the specified anionic surface active agent is not critical.

The above-mentioned procedures can be applied for use of the compounds prepared in Examples 2 to 8, and may be applied for optical brightening of polyethylene and polyester fabrics, as well as the polypropylene fabric, under the same conditions to produce valuable articles.

Through optical brightening, the compounds prepared in Examples 2 to 8 may impart unique nuance to articles, because they have unique fluorescence shade under ultraviolet ray. Therefore, in order to obtain desired color, the compounds prepared in Examples 1 to 8 may be optionally used in combination.

EXAMPLE 12

During melt-spinning for preparation of polyproylene fibers, p-[6-methyl-benzthiazolyl-(2)]-β-[5-p'-methyl-benzoxazolyl-(2')]-styrene prepared in Example 1, as such or as a solution in a suitable solvent, is added to the hot melt of polymeric propylene resin which can be extruded through a spinnerette to form filaments. Use of the above-specified compound in an amount of 0.01%, based on the weight of the said resin, is successful. Alternatively a solution obtained by dissolving the same compound in a suitable solvent (e.g. n-heptane) can be sprayed onto the extruded filaments during or after stretching thereof.

The filaments thus obtained show highly optically brightened appearance and good light fastness. Instead of the spinning operation, casting, pressing or rolling followed by cooling also can produce desired shaped articles with improved appearance.

Similarly, individual compounds of Examples 2 to 8 and mixture of any of the compounds of Examples 1 to 8 can be employed for this treatment.

EXAMPLE 13

0.5 part of the compound prepared as in Example 1 and 1.5 parts of polyethylene glycol ether of aliphatic higher alcohols are made to 100 parts of a dispersion liquid by using water. A polyester fabric is dipped into this dispersion liquid and squeezed out to 80% water content. This is dried at 50°–60° C. and heat-treated at 200° C. for 30 seconds to produce the fabric having improved appearance and good light fastness. In the similar way as mentioned above, polyolefin article can be treated, but in this case, the preferred conditions are a temperature of 100°–130° C. and a treating period of 30–500 seconds.

EXAMPLE 14

A dispersion containing 0.5% of the compound prepared as in Example 1 in a commercially available soap is prepared. When polyethylene sheet is washed by using this dispersion in a usual way, it can be cleaned to show improved white appearance in comparison with that obtained by a usual soap. In this case, a synthetic soap may be used in place of the soap, and if desired, an oxidizing agent containing active chlorine, such as a bleaching powder or sodium hypochlorite, may be added to the soap. By the similar way, the same effects can be obtained by washing a variety of polyester- and polyolefin- made articles, such as filament, film, sheet, etc.

EXAMPLE 15

One part of the compound prepared in Example 1 is mixed with 5 parts of polyethyleneglycol ether of aliphatic higher alcohols, and masticated with a small amount of water and then is dispersed into a large amount of warm water. Then 0.35 part of a commercially available optical bleaching agent for cotton, such as Whitex BB (prepared by Sumitomo Chemical Co., Ltd.) in water is added to make the whole 1000 parts. This aqueous dispersion is applied for a mixed yarn of polyester and cotton (mixed-spun ratio of 65:35) in an amount of 0.03% and thereafter the yarn is treated in the same manner as in Example 9, thereby giving optically brightened yarn.

In this case, use of sulphonic acid derivatives of the compound prepared as in Example 1 instead of the said commercially available bleaching agent can provide similar successful results.

What is claimed is:

1. A diarylene azolyl-styrene compound which corresponds to the general formula:

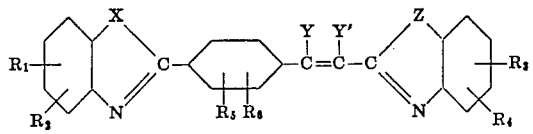

wherein $R_1$ and $R_6$ individually is selected from the group consisting of hydrogen, lower alkyl, lower alkoxy, nitro, cyano and halogen, X and Z individually represent a member selected from the group consisting of oxygen and sulfur and Y and Y' individually represents one member selected from the group consisting of hydrogen, halogen and lower alkyl.

2. p-[6-methyl-benzthiazolyl-(2)]-β-[5'-methyl-benzoxazolyl-(2')]-styrene

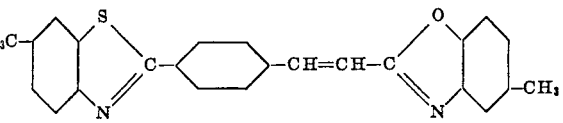

3. p-[5-methyl-benzoxazolyl-(2)]-β-[6'-methylbenzthiazolyl-(2')]-styrene

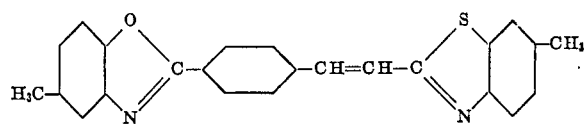

4. p,β-di-[-methyl-benzoxazolyl-(2)(2')]-styrene

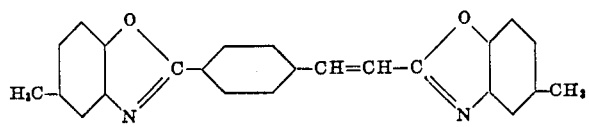

5. p,β-di-[5-methyl-benzoxaxolyl-(2)(2')]-m-chlorostyrene
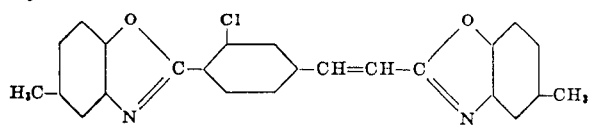
6. p,β-di-[6-methyl-benzthiazolyl-(2)(2')]-styrene
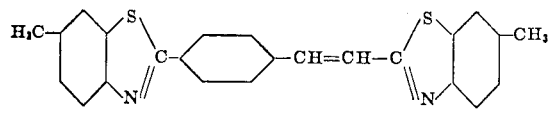
References Cited
UNITED STATES PATENTS
| | | | |
|---|---|---|---|
| 2,992,218 | 7/1961 | Buell et al. | 260—240 |
| 2,985,661 | 5/1961 | Hein et al. | 260—309.2 |
| 3,019,221 | 1/1962 | Schoen et al. | 260—240 |
| 3,133,916 | 5/1964 | Duennenberger et al. | 260—240 |
JOHN D. RANDOLPH, Primary Examiner
U.S. Cl. X.R.
106—176; 252—89 OB, 98, 117, 152, 301.2 W; 260—141, 304, 305, 307